United States Patent [19]

Scott

[11] 4,152,821

[45] May 8, 1979

[54] PIPE JOINING CONNECTION PROCESS

[76] Inventor: William J. Scott, 1901 Lanai Dr., Costa Mesa, Calif. 92626

[21] Appl. No.: 804,885

[22] Filed: Jun. 9, 1977

Related U.S. Application Data

[62] Division of Ser. No. 662,724, Mar. 1, 1976, abandoned.

[51] Int. Cl.² ............................................. B23P 17/00
[52] U.S. Cl. .................................. 29/421 R; 29/237;
29/507; 285/174; 285/242
[58] Field of Search ................... 29/507, 237, 421 R; 285/174, 355, 347, 233, 242

[56] References Cited

U.S. PATENT DOCUMENTS

| | | | |
|---|---|---|---|
| 2,093,092 | 9/1937 | McElhaney et al. | 29/237 X |
| 2,394,341 | 2/1946 | Strong | 29/237 |
| 2,622,652 | 12/1952 | Conroy et al. | 29/237 |
| 2,766,804 | 10/1956 | Kaiser | 29/237 |
| 3,665,591 | 5/1972 | Kowal | 29/507 |

FOREIGN PATENT DOCUMENTS 515415  12/1939  United Kingdom ...................... 29/237

*Primary Examiner*—Charlie T. Moon
*Attorney, Agent, or Firm*—George F. Bethel; Patience K. Bethel

[57] ABSTRACT

The following specification discloses a pipe joining and connection process and apparatus for utilization with all forms of plastic pipes and metal and plastic pipe couplings. The joint comprises a plastic or metal adapter fixture which has been swaged in circumferential relationship to the pipe by expansion of the pipe into the fixture through a process and apparatus which serves to expand and hold the two elements together. The apparatus comprises a metal sleeve on the interior of the pipe and an exterior metal retainer overlying the fixture to provide the necessary hoop strength surrounding the joint. The process is effectuated by means of expanding a resilient elastomer within the bore of the pipe against the sleeve that is concomitantly expanded outwardly against the pipe. The plastic of the pipe is simultaneously caused to flow into grooves within the fixture. A metal retainer ring around the fixture provides for the hoop stress accompanying the expansion so that a retention of the entire fitting is effectuated. In other words, the inner expanded sleeve is expanded outwardly to hold the pipe within the fixture, while the outer metallic retainer ring provides hoop stress for maintenance of the members in juxtaposition with each other. An alternative coupling attachment is provided having O ring seals that are received within a collar, providing for both axial and lateral displacement of the coupled pipes.

2 Claims, 10 Drawing Figures

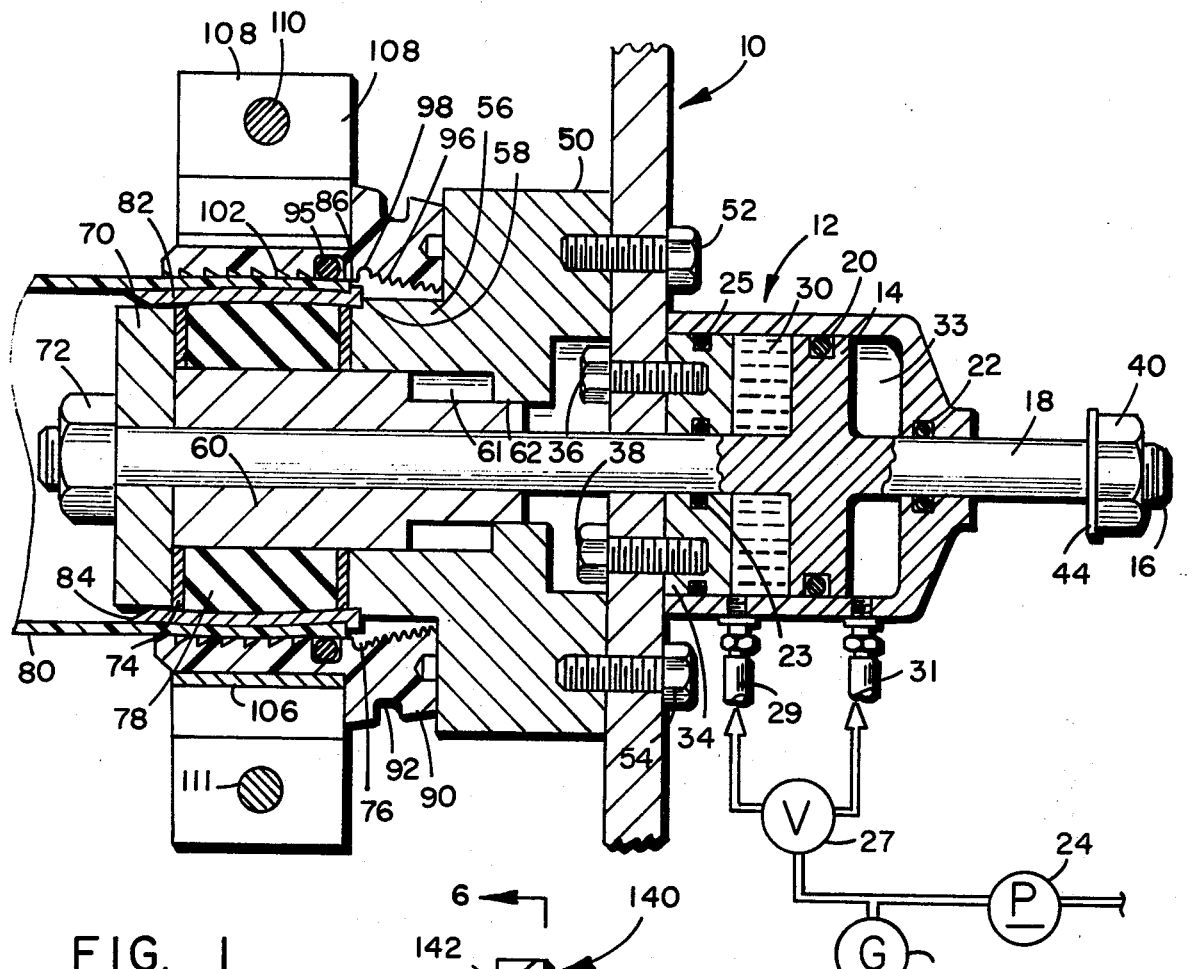
FIG. 1
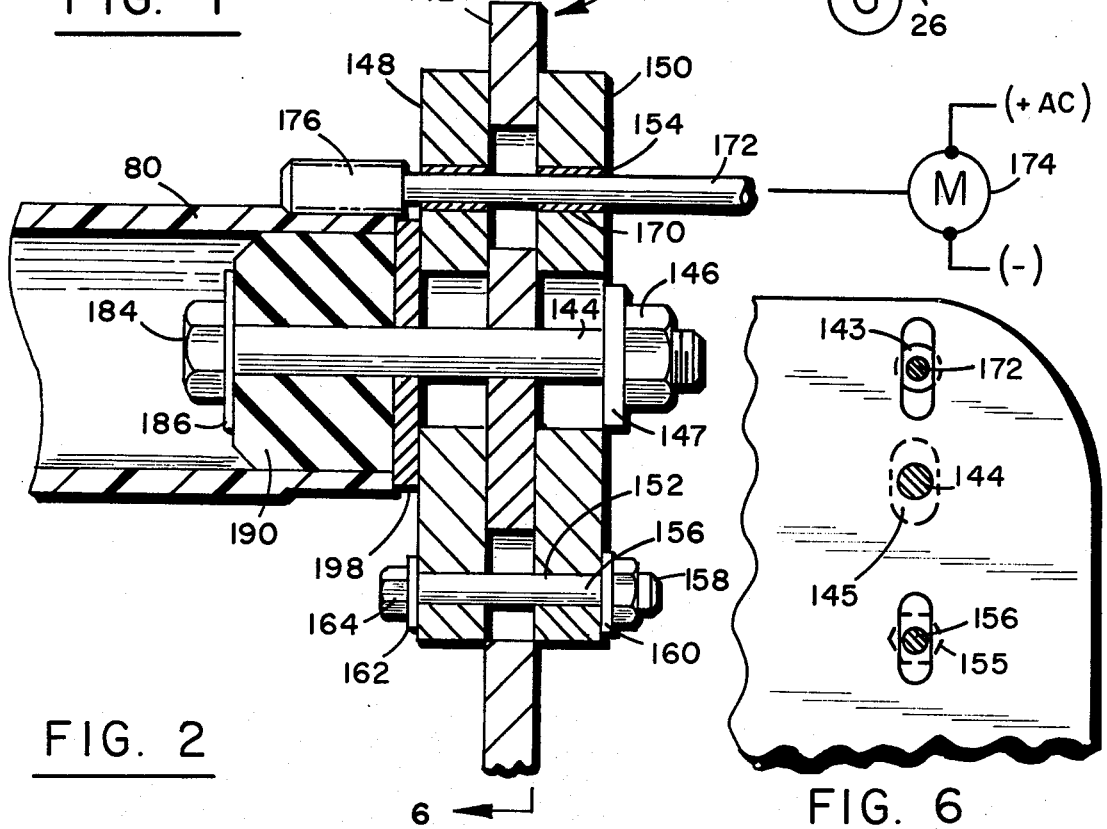
FIG. 2
FIG. 6

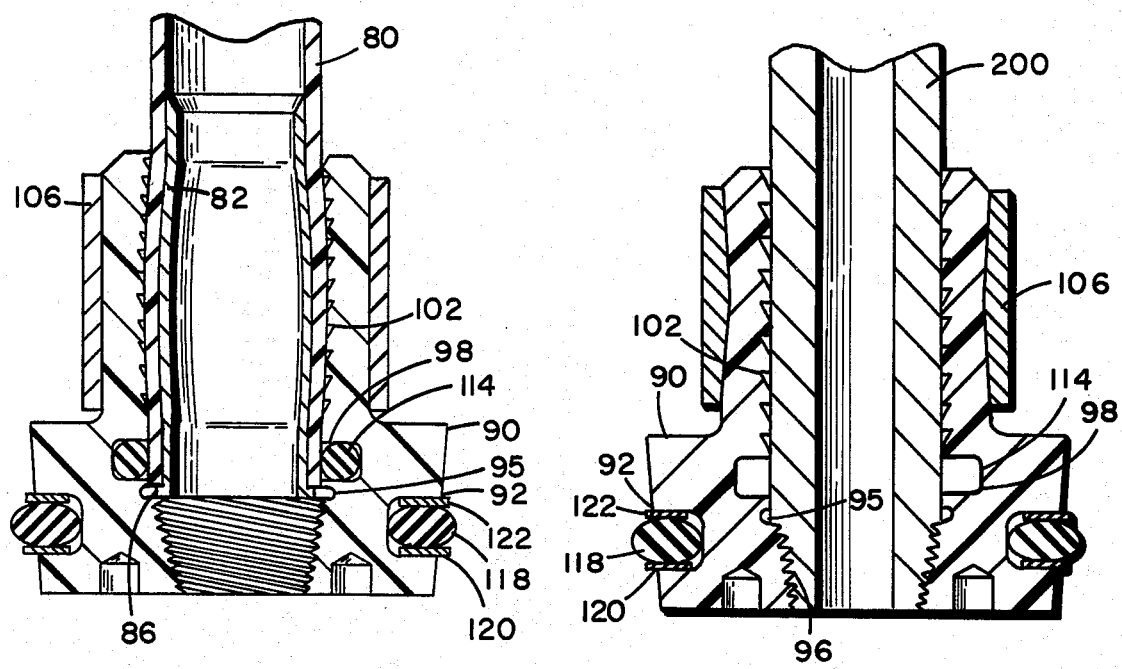
FIG. 3
FIG. 4
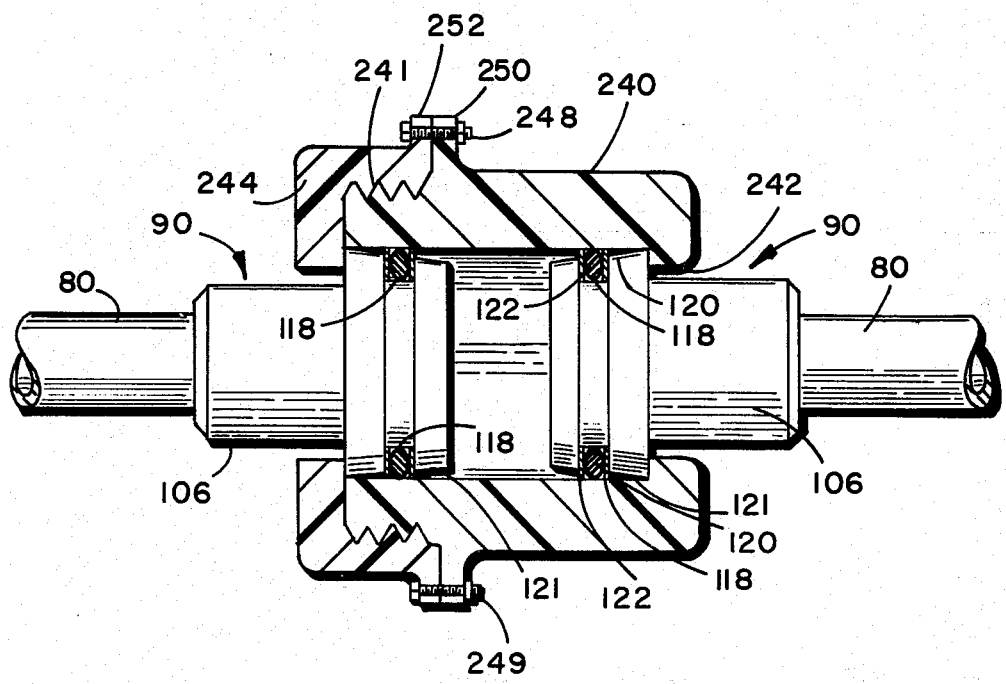
FIG. 5

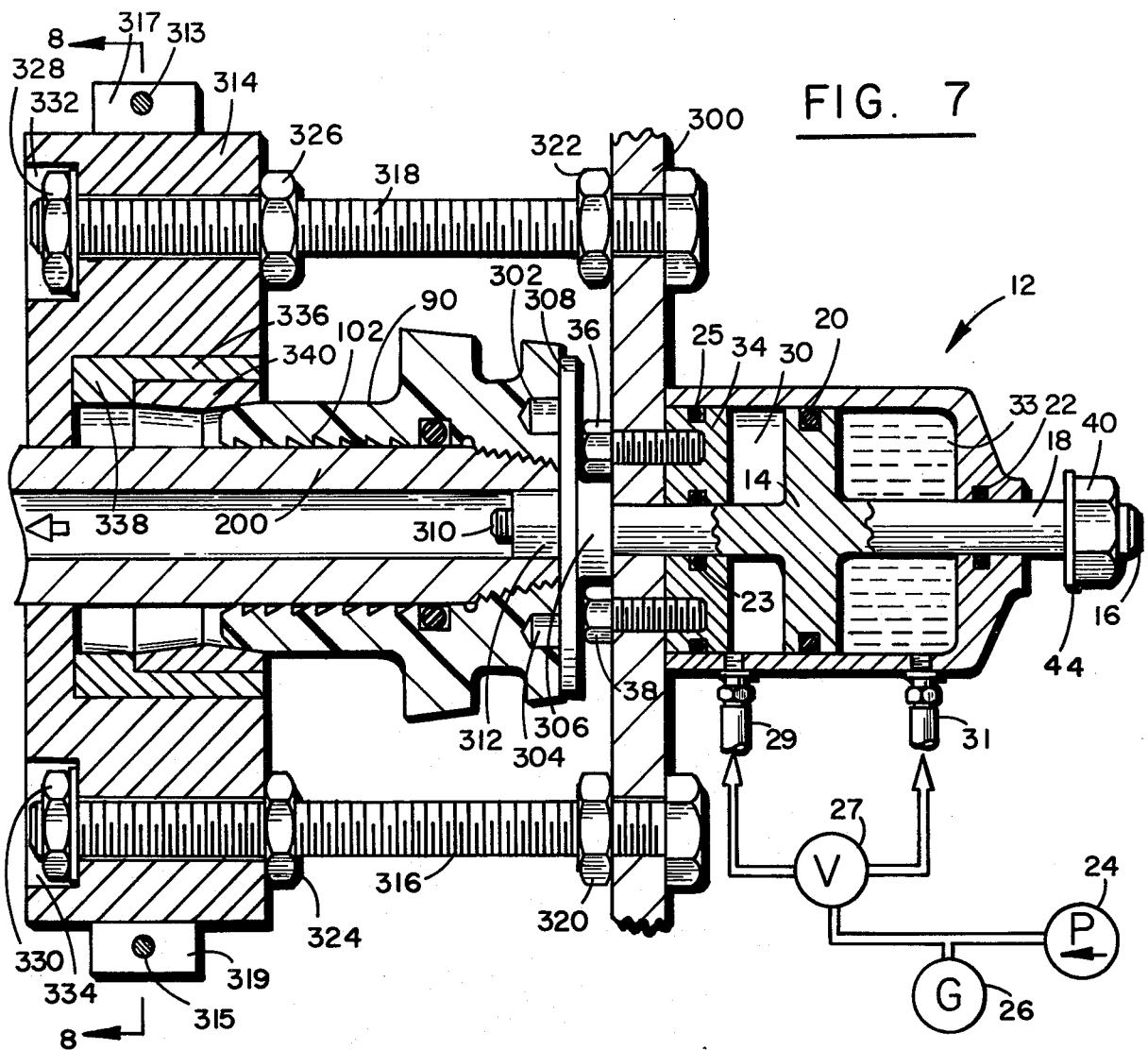
FIG. 7
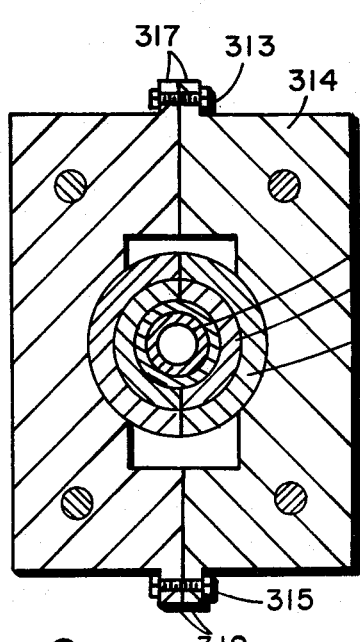
FIG. 8
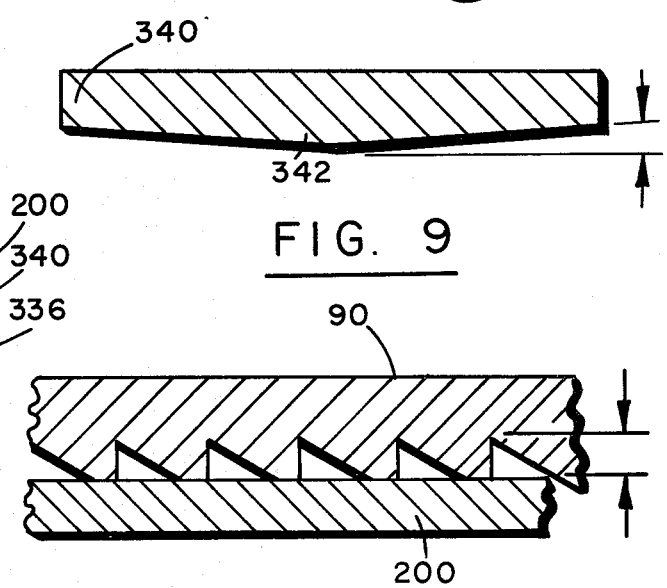
FIG. 9
FIG. 10

PIPE JOINING CONNECTION PROCESS

This application is a divisional of my previously filed application entiled Pipe Joining Connection Process and Apparatus filed Mar. 1, 1976 bearing Ser. No. 662,724, now abandoned.

BACKGROUND OF THE INVENTION

1. Field of the Invention

The field of this invention lies within the art of joining plastic pipes or metal to plastic pipes without the aid of an adhesive. More particularly, it involves the utilization of a swaging process and apparatus for joining a plastic pipe into a fitting and accommodating the fitting to a second fitting joined to a second plastic or metal pipe.

2. The Prior Art

The prior art related to the joining of plastic pipes, reinforced plastic pipes, and other non-metallic pipes, oftentimes involves the utilization of a preformed threaded fitting, a frictional fitting, or an adhesive for bonding the pipes together. In other words, the jointure of plastic pipes has been accommodated by pre-established pipe lengths that are threaded or molded with a particular fitting, or if they must be joined in the field, they have been adhesively bonded.

In most cases, it is common to adhesively bond plastic pipes together. One of the major drawbacks of providing pipes with adhesive joints or frictionally fitted joints, is that the plastic pipes cannot take the type of pressures that are generally involved in high pressure applications. In particular, the pipe joint oftentimes is the weakest point of the entire fluid mechanical system. As a consequence, the limitations on the amount of pressure that can be applied in plastic pipe systems is commensurate with the amount of pressure which adhesive bonded pipes can accommodate.

It has been customary in the past to sometimes use threaded pipe fittings for plastic pipes, as well as other types of clamps to join pipes in a fluid mechanical system. However, the utilization of such apparatus has not effectively created a pipe joint which can withstand high pressure and be applied in a field application. The inventor of this invention has established the fact that with certain plastic swaging and locking techniques, plastic pipe can be used in the same manner as metal pipe, or joined to a metal pipe for complete adaptation of plastic pipe in the field with serviceability at certain required pressures.

A further drawback of the prior art is that certain metal and plastic pipe joints were not capable of being spliced. The metal joints would work against the plastic joints and would cause the plastic threads or other joining means to deteriorate over an extended period of time. This invention overcomes such deficiencies by incorporating a fitting which will not deteriorate with time.

In addition to the foregoing advantages, the fittings and devices described hereinafter incorporate the ability to provide for axial as well as lateral displacement of the pipes that have been joined together. In other words, it is oftentimes a requirement in the field that pipes be able to expand and contract in their axial relationship at the joints, as well as being able to laterally move with respect to each other without undue displacement of the joint. When a normal plastic pipe connection has been made, and axial or longitudinal displacement is encountered, the joint has a tendency to deteriorate or fatigue due to such flexure. This invention allows for axial movement within a collar joint, while at the same time providing for an appropriate seal of the pipes. In addition thereto, the invention allows for lateral displacement of the pipes at the joints so that the bending moment of the pipes in their joined relationship can be accommodated with an overriding collar that secures both pipes together.

The process of this invention incorporates a novel means for expanding and swaging a plastic pipe by causing it to cold flow into a surrounding fixture. The surrounding fixture is secured by a metal retainer ring which provides a certain degree of hoop strength. An expandable metallic inner sleeve secured within the pipe is expanded against the outer hoop strength for accommodation of the cold flowing of the plastic and retention thereof. This is accomplished by a hardened elastomer which circumferentially expands the inner sleeve to the point where it is secured tightly against the pipe and holds it against the hoop strength of the outer ring. The end result is to provide for a plastic cold flow type of joint which has been swaged into a fixture.

The fixture is capable of accommodating a mating fixture, or a threaded member. The entire process is one wherein the ability to cold flow and retain plastic in its cold state is provided for by the expansion of the interior metal sleeve against the outer retaining ring. As a consequence, the device is new with respect to the prior art as to its process and the apparatus attendant therewith for the practice of the process.

The adapter or fixture of the invention can also be used to couple threaded steel pipe by being swaged onto the ends of such pipe and held together by means of a holding collar. The adapter is held onto the pipe by yielding of the plastic serrated tooth members against the metal pipe to seal it against the pipe. Thus, the adapter allows for recoupling of plastic and fiberglass reinforced plastic pipes with similar pipes or with metal pipes. The coupling of such pipes allows for the radial as well as axial movement of the pipes when coupled with a holding collar.

SUMMARY OF THE INVENTION

In summation, this invention incorporates the utilization of a novel process and apparatus for cold flowing plastic into a fixture and providing outer and inner stress for the retention of the fixture on a pipe.

More specifically, the invention incorporates a pipe fitting process which initially routs or machines the pipe to an appropriate size after which it is then provided with an inner sleeve, an outer fixture, and a circumferential retainer ring to provide hoop stress. The inner sleeve is expanded against the pipe by means of a resilient elastomer such as a hard rubber to provide a degree of uniform expansive pressure against the inner diameter of the pipe. The uniform expansive pressure within the inner diameter of the pipe is for purposes of expanding and cold flowing the plastic of the pipe into the outer fixture. The outer fixture can comprise any plastic or metal material, so long as it receives the cold flowing plastic into its grooves or notches thereof. The cold flowing plastic is then secured into the fixture and held in place by an outer retainer ring which provides hoop stress and a certain limitation against further expansion.

The outer retention ring is generally metal and the fixture is plastic so that the hoop stress maintained thereby retains the joint on the pipe in its expanded relationship by virtue of the inner and outer members being compressed against each other with the fixture and pipe therebetween.

The joint can be made in a manner whereby it accommodates an outer coupling to a second pipe, to allow flexure of the pipes within the coupling. The coupling is a circumferential cylindrical member joining the two respective pipes with an inner latching engagement in cooperation with O Rings that provide a seal and allow sufficient lateral displacement of the pipes while at the same time allowing axial movement thereof within the coupling.

BRIEF DESCRIPTION OF THE DRAWINGS

The invention will be more clearly understood by reference to the description below taken in conjunction with the accompanying drawings wherein:

FIG. 1 shows a tool with the fixture and a pipe in connection therewith in cross section being swaged by utilizing the process and apparatus of this invention;

FIG. 2 shows a cross section of a pipe and a tool for preparation of the pipe that is to be swaged in the process and apparatus of FIG. 1;

FIG. 3 shows a cross section of a pipe such as the pipe of FIG. 1 that has been swaged to a fixture of this invention;

FIG. 4 shows a cross section of an alternative embodiment of the jointure means of this invention by which a fixture has been swaged to a metal pipe;

FIG. 5 shows a partial cross section of a flexible connection utilizing the swaged pipes of this invention;

FIG. 6 shows a plan view taken from the direction of 6—6 of FIG. 2 showing the center slot through which the router assembly can be adjusted to accommodate different sized pipes;

FIG. 7 shows a tool with the adapter of the invention and a metal pipe connection therewith in cross section, being swaged according to the process and apparatus of the invention;

FIG. 8 shows a cross section of the split holding block taken in the direction of 8—8 of FIG. 7;

FIG. 9 shows a metal sleeve used in the apparatus of FIG. 7; and,

FIG. 10 shows the yielding of the serrated portions of the fixture or adapter of FIG. 7 when implaced on a steel pipe.

THE PREFERRED EMBODIMENTS

Looking more particularly at FIG. 1, a showing is made of a metal plate 10. The metal plate 10 can be mounted into a bench vice or other mounting means. Also, the metal plate 10 can be of any sort of structure, so long as it holds the device in the manner to be described. For instance, it can be a portion of a free standing support structure, as well as any other suitable configuration.

The metal plate 10 receives a hydraulic cylinder 12 which is secured thereto. The hydraulic cylinder 12 has a piston 14 with a rod or shaft 18. The piston 14 is sealed into the wall of the hydraulic cylinder 12 by means of a main O-Ring 20, and a second O-Ring 25. Similarly, the shaft 18 is sealed by means of O-Rings 22 and 23.

The cylinder 12 is connected to a hydraulic pump 24, which is operated in conjunction with hydraulic pressure gauge 26 and valve 27, all of which are schematically shown in FIG. 1. Valve 27 determines the direction of flow from pump 24 to either line 29 or 31, which communicate with cavity 30 and cavity 33, respectively, on either side of the piston 14.

A securement plate 34, located in the end of hydraulic cylinder 12 is bolted into the support plate 10 by means of threaded machine bolts 36 and 38.

The securement plate 34 can be formed as an integral portion of the base of the hydraulic cylinder 12 or welded thereinto so that the securement plate is actually a base plate to the hydraulic cylinder.

The stem 18 has a threaded end 16 onto which a washer 44 is secured by means of a nut 40. This combination acts as a stop to movement of the stem 18 and piston 14 inwardly when hydraulic pressure is applied to cavity 31.

A base plate or holding jig 50 is shown secured to the plate 10 by means of bolts 52 and 54. The two bolts 52 and 54 secure the holding jig 50 in proper alignment with the stem 18. The hydraulic cylinder 12 is secured to base plate 10 through its base 34 by means of bolts 36 and 38. The spacing plate 50 accommodates the bolts 36 and 38 at their heads by virtue of a shouldered space overlying the two respective bolts and providing a space therein.

The base plate or jig 50 has an upstanding circular cylindrical portion 56 which terminates in a shoulder 58. The upstanding walls 56 of the cylindrical portion 50 receive a shouldered spool 60 within a space between interior shoulders 62 and the diameter of the cylindrical member walls 56. The spool 60 has a reduced section 61 which slides within the interior space between shoulders 62 and the stem 18. In other words, the spool 60 is bored to receive the stem 18 passing therethrough and is fitted to accommodate the space between the shoulder 62 and stem 18 at the interfacial space thereof.

An end disc or traveler 70 is secured on shaft 18 by a nut 72 tightened on a threaded end 17 of the stem 18. The end disc 70 serves to secure a pair of teflon washers 74 and 76 which have a hard rubber cylinder 78 therebetween. The hard rubber cylinder 78 is secured between the two respective discs 74 and 76 or teflon washers, so that the rubber can be compressed and radially expanded by axial movement of the stem 18 to the right of the drawings. In other words, the stem 18 is allowed to move through the central axis of the entire assembly in a manner whereby it compresses the hard rubber cylinder 78 radially outwardly against the inner walls of any member surrounding it, upon actuation of the hydraulic system.

Looking more particularly at the assembly related to the pipe that is to be joined by this invention, it can be seen that a pipe 80 is shown that has been routed to an appropriate size and particularly substantially uniform roundness by the device shown in FIG. 2. Within the pipe 80 is a tube end sleeve 82 having a chamfered surface 84 thereof and a spline or turned over shoulder 86. The spline 86 is seated against the shoulder 58 of the base plate 50. The tube sleeve 82 can be made of a metallic substance, and in this case is preferably made of stainless steel to avoid corrosion and deformation after it has been formed in a manner to be described.

The combination of the pipe 80 and sleeve 82 having the chamfered surface 84 and the shoulder line 86, serves a partial function of joining the entire pipe to a second pipe by means of a fixture or adapter 90. The adapter 90 has an exterior circumferential grooved slot 92 with an interior threaded portion 96. An interior groove 98 is provided into which the shoulder or spline 86 of the sleeve 82 can be fitted upon flexure of the pipe 80. The adapter 90 also includes an interior circumferential groove 95 which can accommodate an O-Ring against pipe 80 to act as an additional seal as shown in FIGS. 3 and 4. The exterior groove 92 is generally configured with side walls to receive O-Rings for sealed securement in a manner to be described.

The adapter or fixture 90 has a series of grooves or serrations 102 circumferentially around the inner portion thereof. The grooves 102 serve to receive the cold flowing plastic of the pipe 80 in a manner to be described. Circumferentially around the fixture or adapter 90 is a retainer ring 106. The retainer ring 106 is held in place during the process of fabrication by means of a clamp 108. The clamp 108 can be drawn circumferentially around the retainer 106 by means of screw fittings 110 and 111, each of which receives a bolt or screw which can be tightened and travel in a manner whereby it is squeezed inwardly. However, any circumferential clamp can be utilized other than the circumferential clamp 108 to secure the retainer 106 around the fixture or adapter 90.

Looking more particularly at the adapter 90, it is seen that threads 96 have been cut in order to accommodate the threaded end of a steel pipe 200 therein as shown in FIG. 4. Furthermore, as can be seen in FIGS. 3 and 4, the adapter has serrations 102 that have been configured to be analogous to a saw tooth configuration. These serve to seal and grip the adapter 90 against a pipe after swaging.

FIG. 3 shows a plastic pipe 80 which has been swaged to an adapter 90 by the apparatus shown in FIG. 1. As shown, the inner metal sleeve 82 has been expanded against the interior walls of the pipe 80, causing cold flow of the plastic pipe into the grooves or serrations 102 found on the interior portions of the adapter 90. The outer metal sleeve 106 provides hoop strength to the swaged adapter.

As mentioned previously, the groove 98 can be provided with an O-ring 114 surrounding the pipe 80 to provide additional sealing of the adapter 90 against the pipe. Such use is optional, but can be resorted to as desired, depending upon the pressure of the fluid moving through the pipe after coupling. Normally, however, the cold flow of the plastic into the serrations of the adapter 90 provide all of the sealing which is required.

In addition thereto, a second O-ring 118 has been provided within the exterior circumferential groove 92. The O-ring 118 is held in place by means of two discs or washers 120 and 122.

The fixture 90 has sloping shoulders 121 and 123 for purposes of allowing lateral flexure of a pipe that has been secured in a collar as hereinafter described, the two discs 120 and 122 respectively accommodate the O-ring 118, so that it will not slip in axial displacement within the adapter 90. This serves the function of locking the O-ring 118 in place so that it will not rotate or move out of the groove 92. However, in some adaptations the two respective discs 120 and 122 are not required. When they are, they can be slipped in place by means of an angularly cut opening provided in both discs whereby they are fitted within the grooves 92 on either side of the O-ring 118.

Looking now at FIG. 7, there is shown the apparatus for swaging an adapter 90 according to the invention onto a threaded metal pipe 200. The swaged metal pipe 200 is shown in FIG. 4. As shown, the hydraulic cylinder of FIG. 1 is attached to a metal plate 300 by means of bolts 36 and 38. The plate 300 can be mounted onto a bench vice or other means. As shown, the hydraulic cylinder is set up for movement to the left of the drawing to provide a pushing force as opposed to a pulling force utilized in FIG. 1.

The steel pipe 200 has an adapter 90 threaded onto its end, utilizing spanner holes 302 and 304 to facilitate turning of the adapter 90 down on the threaded portion of the pipe 200. A spacer 306 adjacent holding plate 300 allows for the accommodation of bolt heads 36 and 38. Spacer 306 is slipped over shaft 18 followed by holding plate 308 having key portions adapted to fit into spanner holes 302 and 304. Holding plate 308 fits against the end of the adapter 90 to provide equal force against the adapter end and pipe 200. A rounded spool 312 fits over threaded portion 310 of the shaft 18 to secure the holding plate 308 tightly against the spacer plate 306. The spool is of a size to slip into the bore of the metal pipe 200.

The pipe 200 with the adapter 90 threaded on it are held in place by means of split holding block 314 which are shown in cross section in FIG. 8. A pair of bolts 316 and 318 secure the holding block 314 in a fixed position relative to holding plate 300. As shown, bolts 316 and 318 pass through holding plate 300 and are secured thereto by means of nuts 320 and 322 respectively. Nut 324 is then threaded onto bolt 316 after which it passes through holding block 314 and is secured in a depression 328 therein by means of nut 330. In the same way, bolt 318 utilizes nuts 326 and 332 in a depression 328 of holding block 314 to hold holding block 314 in a fixed position relative to holding plate 300.

The split holding block 314 has projections 317 and 319 through which pass bolts 313 and 315 for purposes of uniting block 314.

The holding block 314 accommodates an additional holding member 336 which has a shoulder 338. A metal sleeve 340 butts against the shoulder 338 and holding member 336.

An enlarged showing of metal sleeve 340 is shown in FIG. 9. It can be seen that the thickness of the metal sleeve 340 is greater at its center 342 than at its outside ends. The reduced ends of the metal sleeve 340 facilitates the insertion of the adapter 90 by means of the apparatus in FIG. 7, while the thicker center 342 effectively causes the yielding of the plastic tips of the serrated area 102 of the plastic adapter 90 as shown in FIG. 10. This takes place by the center 342 passing over the end of the adapter 90 as the adapter 90 is pushed into the sleeve 340. Additionally, the sleeve 340 strengthens the swaged adapter assembly by holding the adapter securely in place.

As shown in FIG. 7, the actuation of the hydraulic cylinder 12 forces the pipe 200 having the threaded adapter 90 thereon against the flange portion of the steel sleeve 340. This action causes yielding of the serrated tips 102 of the adapter 90 against the walls of the steel pipe 200. At the same time, the metal sleeve 340 forced over the adapter holds and seals the adapter 90 against the pipe 200.

In order to prepare a pipe, for example pipe 80, for receipt of the adapter 90, a jig and router assembly 140 is shown in FIG. 2. The jig and router assembly 140 comprises a steel plate 142 that can be free standing or received in a bench vice.

The plate 142 has securement plate 148 and 150 on either side thereof. A plan view of plate 142 is shown in FIG. 6. It should be remembered that the securement plates 148 and 150 have similarly configured slots and/or openings for receiving bolts, as hereinafter described.

As shown, an opening 143 at the top of the plate 142 accommodates a drive shaft 172. A bushing 170 shown in FIG. 2, which can be formed of any material, receives the drive shaft 172 where it passes through securement plates 148 and 150. Drive shaft 172 is attached at one end to a motor and has a router blade 176 at its other end. Centrally to the plate is a slot 145 which allows for the insertion of a bolt 144. The movement of bolt 144 within the slot 145 allows for the adjustment of the router assembly to accommodate pipes of varying diameter. For example, if the plate 142 and securement plates 148 and 150 are assembled with the bolt 144 near the top of the slot 145, then a small diameter pipe could be routed. A larger diameter pipe would require the bolt 144 to be closer to the bottom portion of the slot 145.

As shown in FIG. 2, the bolt 144 which fits into slot 145 has a head 184 and backup washer 186, a mandrel 190, preferably made of steel, slips over bolt 144 to be held against a spacer plate 198 which fits snugly against the assembly of plate 148, 142 and 150 as previously explained. At its end, bolt 144 has a washer 147 and nut 146 tightened down as shown. The mandrel 190 is sized to approximate closely the inner diameter of a pipe 80 to be routed and will naturally have to be changed according to the diameter of the pipe.

The spacing plate 198 which is slipped over the bolt 144, is selected to establish the depth of cut into the outer diameter of the pipe by the router blade 176. Naturally, different sized pipes and different depths of cut will require different sized spacer plates. The spacer plate 198 and mandrel 190 are preferably made of steel. The tightening of the bolt 146 on the threaded end of the bolt 144 locks the securement plates 148 and 150 tightly against plate 142 and holds the bolt 144 and mandrel 190 into a fixed position relative to the router blade 176.

Referring now to FIG. 2, there is shown an opening 152 in the plates 148, 142 and 150 through which is passed bolt 156. Bolt 156 has a head 164, washer 162 and at its opposite end, a washer 160 against which is tightened nut 158. During adjustment of bolt 144, it is necessary to loosen nut 158 of bolt 156, as well as nut 146 of bolt 144. Upon making the proper adjustment, the nuts 146 and 158 respectively are then tightened down to hold the entire assembly of plates 148, 142 and 150 together.

In operation, the router assembly is first properly adjusted to accommodate a pipe of a known inner diameter. That is, a mandrel 190 is selected to approximate the inner diameter of a pipe followed by adjustment in the slot 145 for determining the depth of cut by the router blade 176. After tightening nuts 146 and 158, the pipe is then slipped over the mandrel 190. Routing is then accomplished by starting the motor 174 which drives shaft 172 and router blade 176. The pipe is then rotated around the mandrel 190 to rout the outer diameter of the pipe as desired.

The purpose for routing the pipe is to bring the pipe to a uniform, round configuration. Plastic pipes are frequently slightly out of round due to their mode of manufacture. Routing brings the outer diameter into closer approximation to the inner diameter of the adapter 90. This allows the adapter 90 to be properly sealed and secured to the pipe.

In the case of plastic pipes, the router would normally be used to achieve a uniformly smooth, round surface for adherence of the adapter 90. In the case of the metal pipes, if desired, threads or serrations could be provided by the router assembly. This is not desirable, however, in the case of fiberglass reinforced plastic pipes, due to the fact that grooving such pipes would produce stress risers resulting in reduced stress points, causing the possible failure of such a pipe upon flexure across its weakest point.

In addition, the router assembly can be used to provide, for example, a steel pipe with serrations corresponding to the serrations 102 found in the inner diameter of the adapter 90. Although in most cases this is not necessary.

It can be seen now from the above description that the adapter fitting 90 can be used for both the coupling of plastic pipes as well as metal pipes. Its adaptability allows for interchangeability for the plastic to plastic connections, as well as metal to plastic connections. However, it should be understood that in most instances, the jointure provided by the adapter 90 of this invention provides the greatest advantages for coupling plastic and fiberglass reinforced plastic pipes.

Also, while the adapter is preferably made of a plastic material, it is not limited thereto. For example, the adapter 90 could be formed of a metal, such as aluminum or fiberglass reinforced plastic.

The exact manner of joining two pipes having adapters swaged thereon is shown in FIG. 5.

Looking more particularly at FIG. 5, two pipes 80 are shown, each swaged to the adapter 90 of this invention. Each adapter 90 incorporates an O-ring 118 and discs 120 and 122. The adapter 90 can be seen having sloping shoulders 121 residing within an outer collar 240. The collar 240 has a shoulder 242 that overlies the end of the adapter 90. In addition thereto, the collar 240 has a projecting flange 250 and threads 241 at its end. An end cap 244 is provided having a flange 252 and interior threads 246 which thread down on the threads 241 of the collar. These two members can be joined together by means of a pair of bolts 248 and 249 passing through flanges 250 and 252 in the respective mating members, so that a tight securement thereof can be accommodated.

Looking at FIG. 5, it can be seen that the sloping shoulders 121 of the adapter 90 allow for lateral flexure of the pipes 80 in their connected relationship by means of the overlying collar 240 and end cap 244. In other words, not only can the pipes move laterally up and down outside of the axis of the two respective pipes in aligned relationship, but they can also move with regard to the collar 240.

In addition thereto, the O-ring 118 allows for a seal to be made, while at the same time allowing for axial movement of the pipes 80 in the direction of each other so that when expansion and contraction takes place, the plastic pipes can be moved inwardly and outwardly with respect to each other. It should be understood that when pipes are currently joined by either adhesive or a fixed fitting, they do not have the expansion capability as described in this invention.

FITTING PROCESS AND OPERATION RELATED THERETO

The pipe 80 is first prepared using the routing assembly of FIG. 2 by securing the plate 140 into a bench vice, or if it is free standing, merely preparing the entire device for operation. The locking assembly comprising the bolt 144 and the mandrel or spool 190 is then matched to the respective pipe that is to be prepared. The spacer 198 which determines the depth of cut into pipe 80 is also implaced behind the spool 190. The spacer 198 implaced in a lesser or greater thickness also determines how far the pipe is to be routed along its longitudinal length.

As mentioned previously, the router blade 176 can comprise a blade having a serrated configuration or other means in order to cut grooves into the pipe.

The router head 176 can also be merely a smooth finishing type router head which provides a smooth radially uniform surface around the circumference of the pipe 80.

After the pipe 80 has been prepared, it is placed within the apparatus shown in FIG. 1, with the inner sleeve 82 fitted therein. As can be recalled, the inner sleeve 82 is generally made of a metallic material such as stainless steel, and is provided with a shoulder flange 86, which causes it to seat within the end of the pipe.

The entire structure is slid over the rubber spool 78 with the adapter fixture 90 thereover, as well as the retainer ring 106.

In addition thereto, in order to limit outward expansion to a given distance, the clamp 108 is tightened down to an appropriate circumferential dimension in order to allow for expansion of the entire assembly uniformly to a given outside diameter or stress point, in other words, the clamp 108 secures the outer retainer ring 106, so that it does not expand inordinately, or at least provides a set point beyond which the retainer ring 106 can not expand.

After the foregoing setup has been accomplished, the pipe 80 is then swaged to the adapter fixture 90 by means of applying either a hand pump or fluid mechanical motor driven pressure to the space 30 which causes the piston 14 to move toward the right of the drawings. The expansion to the right of the drawings causes a compressive pressure on the hard rubber spool 78. The hard rubber spool can be of a ninety durometer grade. The compression on the hard rubber spool 78 causes it to expand outwardly against the inner sleeve 82. This in turn causes the plastic in the pipe to cold flow into the grooves 102. The cold flow of the plastic within the gooves 102 of adapter 90 is maintained during the compressive cycle of the rubber spool 78 until it reaches the outside stress limit of the clamp 108 and the outer retainer ring 106.

Thus, the cold flow of the plastic in the pipe 80 is maintained within the adapter fixture 90 by means of the stress and outwardly expanded inner sleeve 82. The sleeve 82 retains its outwardly expanded form against the inwardly compressive hoop stress of the retainer ring 106.

Afterwards, the assembly is then disconnected by backing off the cylinder and accommodating the flow of material backward to its precompressed state. The adapter fixture 90 can then be connected in the manner as previously stated wth regard to the respective collars 240 and the other fixtures as shown in FIG. 5.

The above description is applicable to the swaging of the adapter 90 to plastic or fiberglass reinforced plastic pipe and the like. The procedure for swaging of the adapter 90 to a metal or steel pipe is slightly different.

The pipe, for example a steel pipe, can be routed using the router assembly of FIG. 2 and following basically the same procedure as for plastic pipes. That is, the exterior portion above the threaded area would be routed to produce a uniformly smooth, round, surface area, or in some instances, it might be desirable to provide serrations or grooves in this area.

After the steel pipe has been routed, a metal sleeve of the proper dimensions is slipped over the pipe followed by threading of the adapter 90 over the steel pipe utilizing the spanner holes 302 and 304. This assembly is then slipped over the steel 312 and the pipe utilizing the spanner holes 302 and 304. This assembly is then slipped over the steel 312 and the pipe and adapter rotated to allow key portions of holding plate 308 to align with spanner holes 302 and 304.

A holding block 314 is then assembled with metal sleeves 340 abutting against the shoulder 338 of holding member 336. The insertion and tightening of bolts 318 and 316 as previously described, keeps the holding block and pipe 200 in alignment with the hydraulic cylinder 12. Hydraulic cylinder 12 is connected to holding pate 300. The securing of both clamps 313 and 315 of holding block 314 completes the assembly of FIG. 7.

Actuation of the hydraulic cylinder 12 in the direction shown, to the left of the drawing, pushes the adapter 90 with the pipe 200 into the flanged area of metal sleeve 340. As the portions of the adapter 90 pass through the area 342 of greatest thickness, in metal sleeve 340, the serrated areas 102 of the adapter are yielded against the steel pipe 200. At the same time, after insertion, the metal sleeve 340 provides hoop strength to the adapter 90 holding it tightly against the surface of the pipe 200. This assembly of the apparatus of FIG. 7 allows for removal of the swaged pipe after which it can be joined by another pipe by utilizing the collar assembly 240 and 244 of FIG. 5.

If the use of O-ring 114 in groove 98 of the adapter 90 is desired, it should be slipped into the adapter prior to threading onto the end of the metal pipe 200. This provides an additional sealing if desired. Its use is optional.

It can be appreciated that the adapter 90 of the invention is versatile in that it can be used to swage both threaded metal pipes, as well as unthreaded plastic pipes. Furthermore, it provides a means to join these two dissimilar pipes by use of the collar assembly 240. Other types of collars can be used which will allow angled joining of swaged pipes. Such collars permitting various angled joints as 90° to 45°, as well as tee joints will be apparent to those skilled in the art and can be resorted to without departing from the scope and spirit of the invention.

As a consequence, this invention is to be read broadly in light of the prior art and particularly with regard to joining and swaging plastic to metal or plastic to plastic pipes.

I claim:

1. A process for adapting a fitting to a plastic pipe comprising:
   sizing a pipe that is to be fitted to an appropriate size for receipt of a fitting thereon;
   placing a metal sleeve within the end of said pipe that is to be fitted;
   placing an adapter fixture having a series of interior grooves along the inside surface that is to be received on the outside of said pipe over the outside circumferential end thereof that has been sized to the adapter fixture;
   placing a circumferentially elastomeric expandable material within said sleeve;

providing a hydraulic cylinder for compressively driving the elastomeric expandable material;

expanding said material outwardly against the interior surface of said sleeve and attendantly expanding the plastic of the pipe against the adapter fixture to cause the plastic of said pipe to cold flow into the interior grooves of said adapter;

controlling the expansion of said pipe and said sleeve beyond a given point; and, retaining the expansion of said sleeve and plastic of the pipe by means surrounding the pipe and adapter fixture wherein the inner sleeve is expanded in a force relationship against said means to a point of mutual stress between the sleeve and the retaining means.

2. The process as claimed in claim 1 further comprising:

sizing said pipe by initially routing a surface around the edge thereof.

* * * * *